(12) United States Patent
Daigre (10) Patent No.: US 6,988,597 B2
(45) Date of Patent: Jan. 24, 2006

(54) MECHANICALLY APPLIED/HYDRAULICALLY RELEASED BRAKE

(75) Inventor: Richard Daigre, Hopkinsville, KY (US)

(73) Assignee: White Hydraulics, Inc., Hopkinsville, KY (US)

( * ) Notice: Subject to any disclaimer, the term of this patent is extended or adjusted under 35 U.S.C. 154(b) by 0 days.

(21) Appl. No.: 10/058,183

(22) Filed: Jan. 26, 2002

(65) Prior Publication Data

US 2003/0141152 A1    Jul. 31, 2003

(51) Int. Cl.
*F16D 65/24*    (2006.01)
(52) U.S. Cl. .................. 188/170; 188/166; 188/325; 188/329; 267/176
(58) Field of Classification Search ............... 188/329, 188/380, 170, 166, 360, 78, 325, 72.6, 72.7, 188/72.8; 267/174, 176
See application file for complete search history.

(56) References Cited

U.S. PATENT DOCUMENTS

| 1,476,989 | A | * | 12/1923 | Massey ................. 192/12 C |
| 1,988,986 | A | * | 1/1935 | Sterns .................. 188/181 A |
| 2,215,546 | A | * | 9/1940 | Dick ...................... 188/170 |
| 2,328,619 | A | * | 9/1943 | Cox ....................... 188/170 |
| 2,339,415 | A | * | 1/1944 | Larson ................... 188/170 |
| 3,465,850 | A | * | 9/1969 | Sexton .................... 188/75 |
| 3,722,636 | A | * | 3/1973 | Kobelt ................... 188/170 |
| 3,752,266 | A | * | 8/1973 | Chouings ............... 188/170 |
| 4,192,405 | A | * | 3/1980 | Lee et al. .............. 188/170 |
| 4,254,641 | A | * | 3/1981 | Gauer et al. ............ 68/23.7 |
| 5,310,251 | A | * | 5/1994 | Towers et al. ........... 303/11 |
| 6,405,837 | B1 | * | 6/2002 | Muramoto .............. 188/72.5 |

* cited by examiner

*Primary Examiner*—Robert A. Siconolfi
*Assistant Examiner*—Bradley T. King (57) ABSTRACT

A spring applied/hydraulically released brake mechanism for a mechanical brake including an actuator lever extending between a movable piston, which piston is normally biased to a closed position by a spring with a selective pressurization of a chamber on the other side of the piston deactivating the mechanical brake through the lever.

32 Claims, 7 Drawing Sheets

MECHANICALLY APPLIED/HYDRAULICALLY RELEASED BRAKE

FIELD TO WHICH THE INVENTION RELATES

This invention relates to an opposing piston and spring which actuates/deactivates a mechanical brake depending on the pressurization of a piston chamber.

BACKGROUND OF THE INVENTION

Mechanical and hydraulic brakes have been utilized on mobile devices and winches for many years. Typically, mechanical brakes are actuated through some sort of wire or cable interconnection from a brake pedal or lever arm, the movement of which activates mechanical brake. Alternately, a hydraulic system is utilized between the brake pedal or lever, with the operative forces therebetween being transferred through the selective pressurization of a closed hose interconnecting same directly to a remote hydraulic brake cylinder to apply the brake. These devices are all relatively efficient in the transferring of forces between the brake pedal or lever with the rotating member the brake which is associated, be this rotating member a winch, a wheel, or other rotatable device.

One application for this type of brake mechanism is a combined axle and brake for movable cranes, winches for trucks, and scissorlifts. An example of this is the hydraulically released spring applied brake mechanism of Genie Industries of Edmond, Wash. However, the cost of these mechanisms is sufficiently high that most manufacturers use alternate mechanisms, for example the separate drum brake systems from a small automobile. These devices are not cost-efficient to assemble, or repair.

The present invention is designed to provide a simple reliable braking mechanism in a small space remote from the actuating system.

OBJECTS AND SUMMARY OF THE INVENTION

It is an object of this invention to provide for efficient remote activation of a mechanical brake;

It is another object of the present invention to increase the mounting flexibility of mechanical brakes;

It is yet another object of the present invention to increase the usability of mechanical brakes;

It is a further object of the present invention to provide for the automatic operation of mechanical brakes;

It is yet another object of this invention to reduce the cost of manufacture of mechanical brake motor units; and, It is another object of the present invention to increase the reliability of mechanical brakes.

Other objects of the invention and a more complete understanding of the invention may be had by referring to the drawings in which:

DETAILED DESCRIPTION OF THE INVENTION

The present invention is directed to an actuation mechanism which provides for the remote modification of the condition of the mechanical brake through the use of hydraulic pressure. The device also includes a deactivating mechanism which mechanically releases the bias of the mechanical brake if separately desired by the operator.

In the preferred embodiment disclosed the device is a spring and hydraulically modified actuating mechanism 10. This actuating mechanism is designed to selectively alter the state of the mechanical brake between an activated condition to a deactivated condition (or vice-versa).

In the preferred embodiment the actuation mechanism 10 is spring applied and pressure release. In the embodiment shown this provides for a mechanical parking brake under unpressurized condition of the actuation member. An integrated deactivating cam can be separately manipulated to release the pressure of the spring, and thus the spring bias on the brake with which the actuation mechanism is associated.

The mechanical brake 50 is designed to mechanically provide the activating/deactivating force between a rotating shaft 100 and the frame 200 of an associated stationary device. The mechanical brake selectively retards or allows the rotation of the shaft 100 in respect to the frame 200 of the stationary device.

In the particular embodiment disclosed, the shaft 100 is rotatively interconnected to the frame 200 of the stationary device through an intermediate member 150. Bolts 210 hold the intermediate member to the frame. Bearings 105, 106 rotatively mount the shaft 100 to the intermediate member 150. The particular intermediate member 150 disclosed has a power unit associated therewith, a gerotor motor 160 disclosed. Upon the pressurization of this gerotor motor it rotates the shaft in respect to the frame. The intermediate member 150 thus serves to associate connect the actuation mechanism 10 with the brake, to rotatively mount the shaft to the frame as well as providing for an interconnection between the gerotor motor 160 and the shaft 100. It is preferred that the actuating mechanism 10 be integral with the intermediate member 150. This reduces the number of parts. This facilitates manufacture and repair. It also, in the preferred embodiment disclosed, integrates the shaft, brake, actuation mechanism and gerotor motor into a simple device that can be included into numerous diverse applications with a minimum of effort.

The actuating mechanism 10 is itself associated by the intermediate member to a mechanical activated brake. This mechanical brake extends between the shaft 100 and a stationary member in order to selectively retard the rotation of the shaft. In the preferred embodiment disclosed, the stationary member is the intermediate member 150 which is itself interconnected to the frame 200 as previously set forth.

The preferred brake disclosed is a drum brake including a drum 60 and expanding shoes 70. The drum 60 itself is fixedly interconnected to the shaft 100 for rotation therewith. The drum itself has an internal friction surface 61 and a wheel mounting face 63. The internal friction surface 61 is utilized in conjunction with the later described expanding shoes 70 in order to selectively retard the rotation of the drum 60. The wheel mounting face 63 is utilized in conjunction with a series of mounting lugs 65 in order to removably connect a further object (such as a wheel or winch) to the drum 60.

The expanding shoes 70 are the main movable operative member for the mechanical brake 50. In the embodiment disclosed, there are two semi-circular brake shoes 71, 72 extending in two opposed arcs within the drum 60. A spring 75 biases these members to be spaced from the internal friction surface 61 of the drum when the brake is not activated, thus to eliminate incidental friction in respect thereto. Upon movement of an operating member 76 located between the shoes, the brake shoes 71, 72 mutually expand to contact the internal friction surface 61 of the drum 60 thus to retard movement thereof. In the particular embodiment disclosed, an activating lever 80 accomplishes this movement of the operating member 76. The lever 80 accomplishes this by rotating about a pivot 82 fixedly connected to the intermediate member 150, which action causes movement of the operating member 76 to mutually expand the brake shoes. In the particular embodiment disclosed, counter-clockwise rotation of the lever 80 about the pivot 82 will apply the mechanical brakes. The particular brake is an off-the shelf mechanical drum brake (Dana drum brake—Model #4170539). This brake is normally utilized with a wire or cable to the lever 80. In the present invention it is not: it is operated by the activation mechanism. The brake is held on the intermediate member through four cap bolts into holes 158 therein. This allow field repair/replacement of the brake with easily available parts independently of the actuation mechanism (and/or gerotor motor). Alternate mechanical brakes could be utilized with the invention. This would include mechanically operated disk brakes. Preferably these brakes would also be stock or quasi-stock brakes common to an industry. This facilitates initial construction and field repair.

The invention of this particular application relates to the actuating mechanism 10 which selectively causes the movement of the lever 80, thus selectively manipulating the condition of the mechanical brake 50. The preferred actuating mechanism includes an activating spring 20, a selectively movable piston 30 and a deactivating cam 40.

The activating spring 20 biases the mechanical brake into a desired operating condition. In the preferred embodiment disclosed, the activating spring 20 biases the lever 80 and the expanding shoes 70 into a braked condition. The particular spring 20 is located in the cavity 23 of a actuation cylinder 24, which cylinder is itself fixedly connected to the intermediate member 150. (Integral in the preferred embodiment disclosed.)

Also located within the cavity 23 of the application cylinder 24 is the piston 30.

The piston 30 is the main actuation member for the mechanism 10. Upon the selective pressurization of the closed chamber 31 via a hydraulic line 33, the piston 30 is moved in order to change the condition of the mechanical brake 50. In the preferred embodiment disclosed, as the device is spring applied/pressure released, the piston 30 is utilized to overcome the force of the activating spring 20 in order to release the brake. (A stop 21 located within the activating cavity next to the spring 20 so as to prevent the over compression thereof.)

Figure 3:
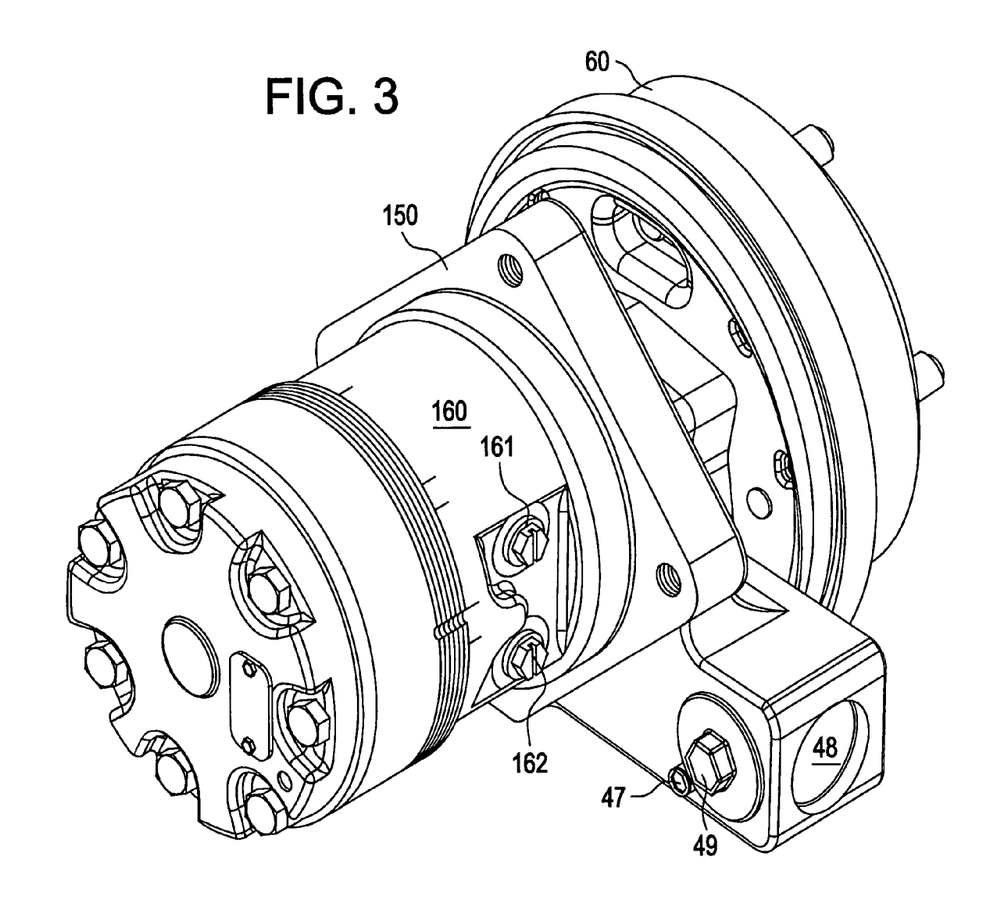
FIG. 3 is a perspective view of the device of FIG. 1.
Figure 3A:
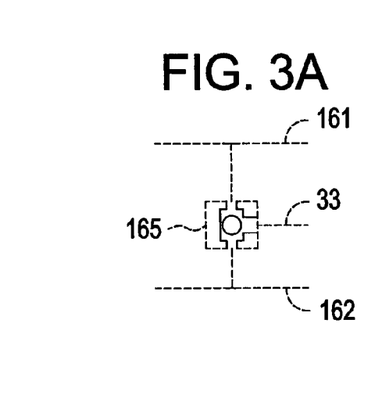
FIG. 3A is a representational view of a possible hydraulic diagram for use with the actuation mechanism.
Figure 4:
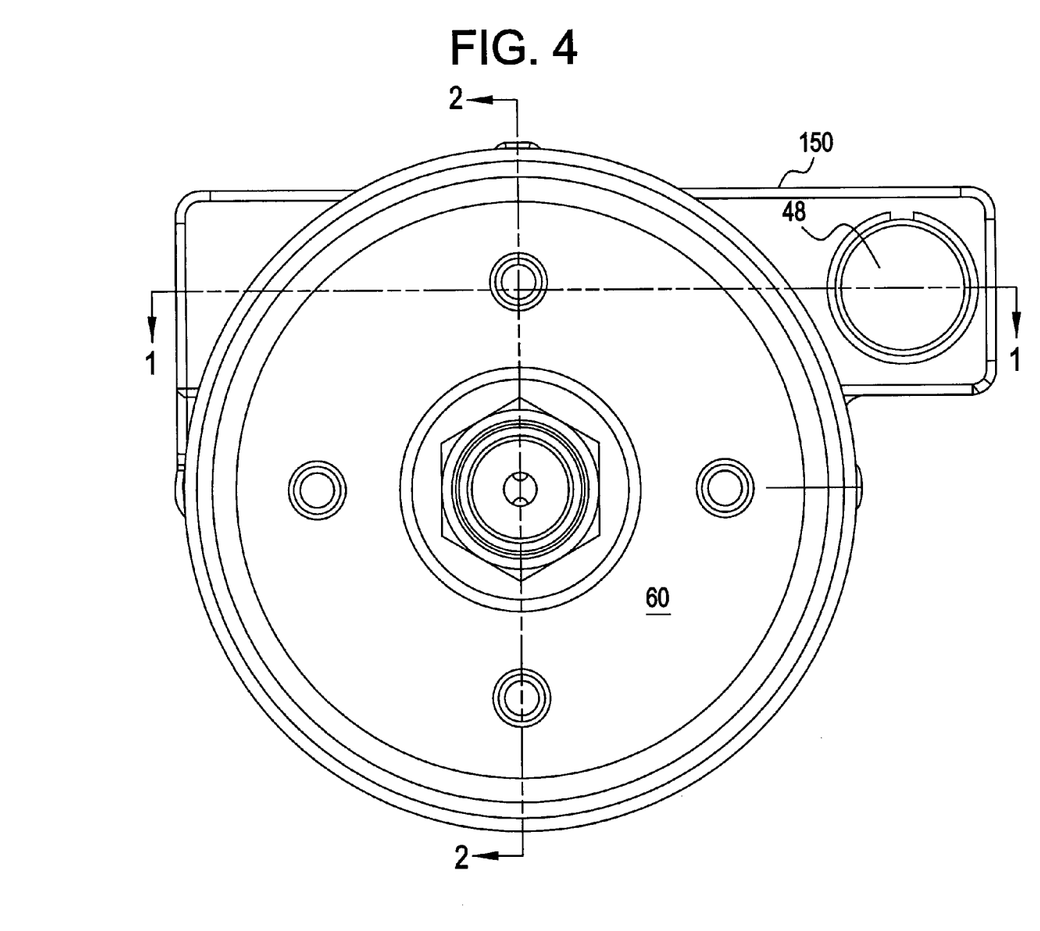
FIG. 4 is a longitudinal view of the device of FIG. 1 taken generally from lines 4—4 therein.
Figure 5:
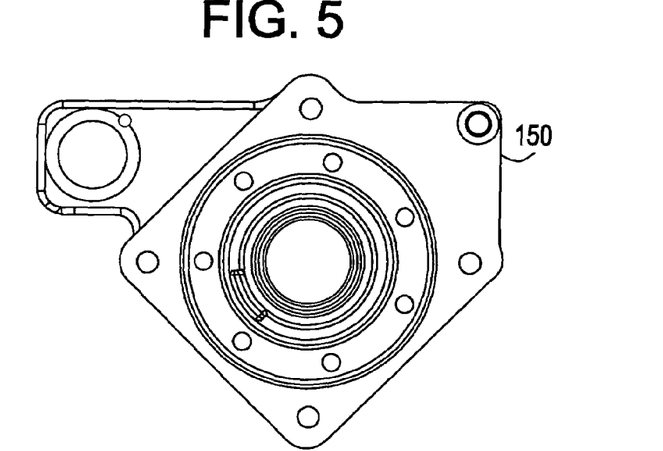
FIGS. 5 and 6 are end views of the intermediate member of FIG. 1.
Figure 6:
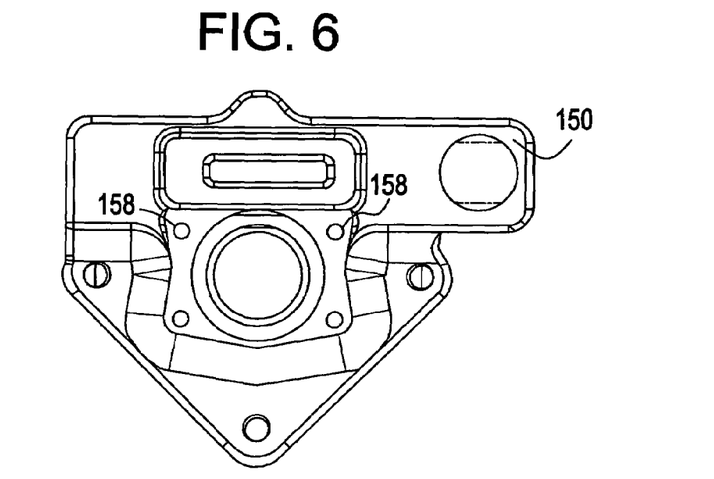
Figure 7:
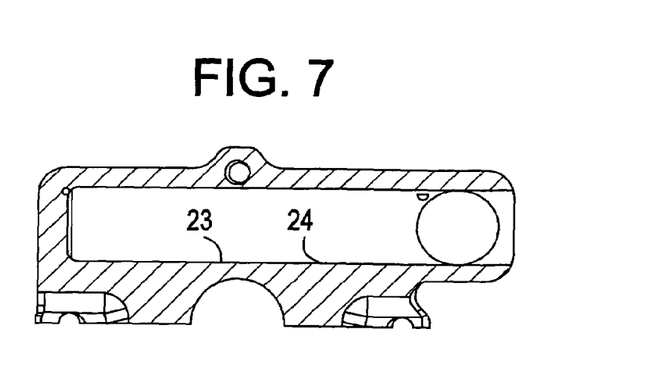
FIG. 7 is a lateral cross-section like FIG. 1 of the cavity of the intermediate member.
Figure 8:
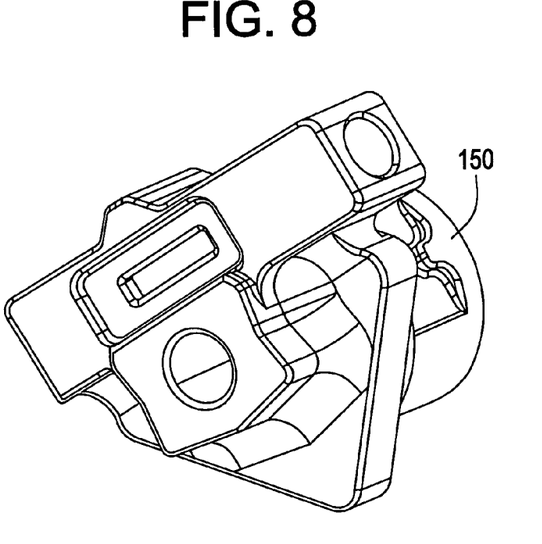
FIG. 8 is a perspective view of the intermediate member of FIG. 1.
Figure 9:
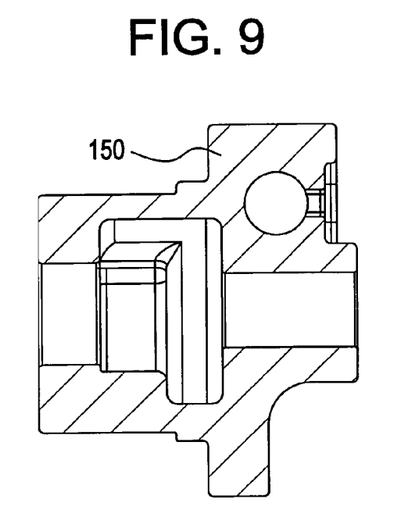
FIG. 9 is a longitudinal cross-section of the intermediate member of FIG. 1.
Figure 10:
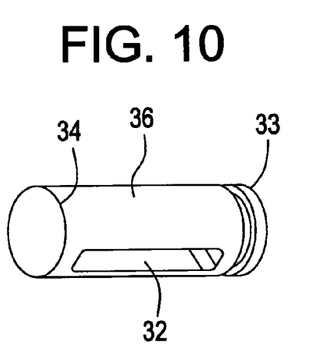
FIG. 10 is a perspective view of the piston utilized in the actuation of the brake.
Figure 11:
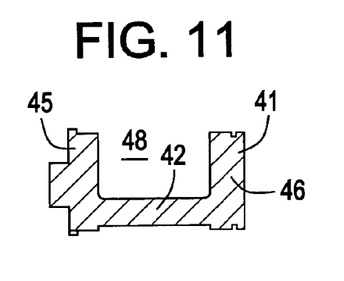
FIG. 11 is a cross-section of the deactivating cam.
Figure 12:
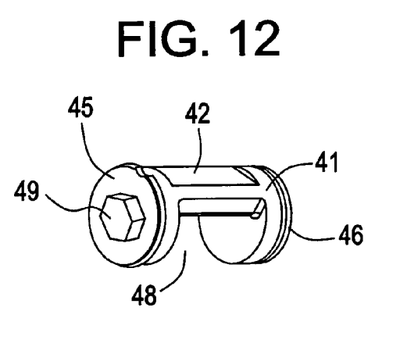
FIG. 12 is a perspective view of the deactivating cam.
Figure 13:
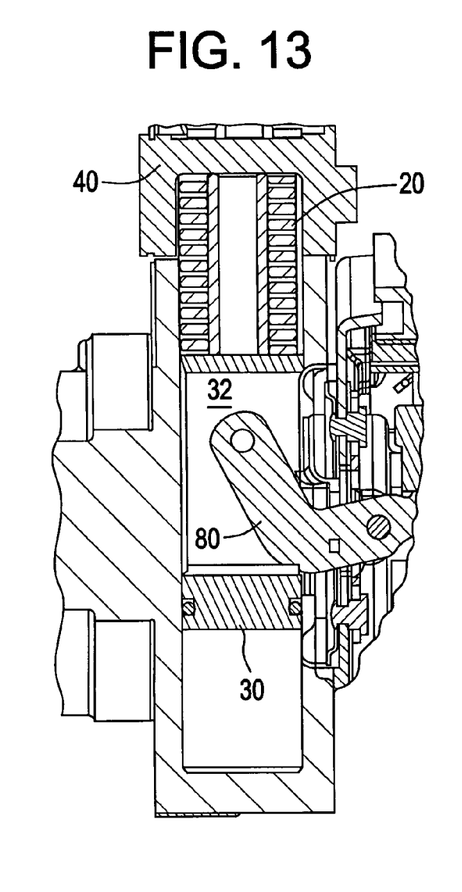
FIG. 13 is a partial cross-section liner FIG. 1 showing the deactivating mechanism in a release position; and, FIG. 14 is a view of a two port activated actuation member.

In that the spring 20 is located on one side of the lever 80 while the chamber 31 is located on the opposite side, there is a bypass slot 32 located in the piston 30 (see FIG. 10). This bypass slot effectively creates two sections for the piston, a pressure plug 33 and a spring plug 34. The pressure plug 33 is utilized in conjunction with the internal walls of the cavity 23 of the application cylinder 24 in order to create the chamber 31 for selective pressurization. An "O" ring 35 provides the seal between the pressure plug 33 and the cylinder 24 in the embodiment disclosed. The spring plug 34 on the opposite side of the bypass slot 32 is substantially the same diameter as the cavity 23 and the activating spring 20 so as to allow for a uniform 360° contact therewith. (It is not necessary for a seal to be included between the spring plug 34 and the cavity 23 due to the lack of pressurization of this joint.) This spring plug 34 connects the piston to the spring 20. It also prevents angular shifting of the pressure plug 33 in respect to the cavity 23. In the embodiment disclosed, the stop 21 prevents the over compression spring upon pressurization of the chamber 31. This allows the full-time pressurization of the chamber 31 during the entire time of operation (i.e. it is not necessary to valve the incoming hydraulic line to manipulate the pressure in the chamber 31 out of concern for the spring 20). Note that this attribute of continual pressurization of the chamber would allow conjunctive operation of the actuation mechanism 10 with the gerotor motor. For example the hydraulic line could be utilized to fluidically connect the chamber 31 to both ports 161, 162 of the gerotor motor 160. Thereafter upon pressurization of either port the brake 50 shown would be released (a check valve 165 would be utilized to provide a connection of the port having higher relative pressure to the line 33—see FIG. 3A). In this embodiment, upon cessation of operation of the gerotor device, the pressurization would be released from the chamber 31 and the brake would be applied. (Further note the valve to the gerotor motor should have a line bleed off to allow for this depressurization.) Alternately a piston with two chambers could be utilized—for example, each connected individually to the two gerotor lines, 161, 162—pressure and return, internally or externally of the intermediate member (33 and 133 in FIG. 13). This would automatically manipulate the brake 50 as soon as the gerotor motor was energized for rotation in either direction. This would also allow the dual operation of the actuation mechanism (for example a separate valve or a valve and one port of the gerotor motor).

In the particular embodiment disclosed, the piston 30 has two solid semi-circular portions 36 on either side of the slot 32 so as to fixedly interconnect the pressure plug 33 with the spring plug 34. This allows the mechanical forces from the pressurized chamber 31 to compress the activating spring 20 and release the mechanical brake 50 in the embodiment disclosed. Pins, collars or other connection means could also be utilized. (It is not necessary that the piston 30 be a single, unitary piece. This is particularly so in the embodiment shown since the piston moves the spring in one direction.)

Located immediately off the end of the application cylinder 24 is a deactivating mechanism 40. This deactivating mechanism selectively deactivates the activating spring 20 so as to remove the bias on the mechanical brake under any condition.

In the embodiment disclosed the deactivating mechanism includes a rotary member 41 having a cam 42 between two cylindrical portions 45, 46.

Figure 1:
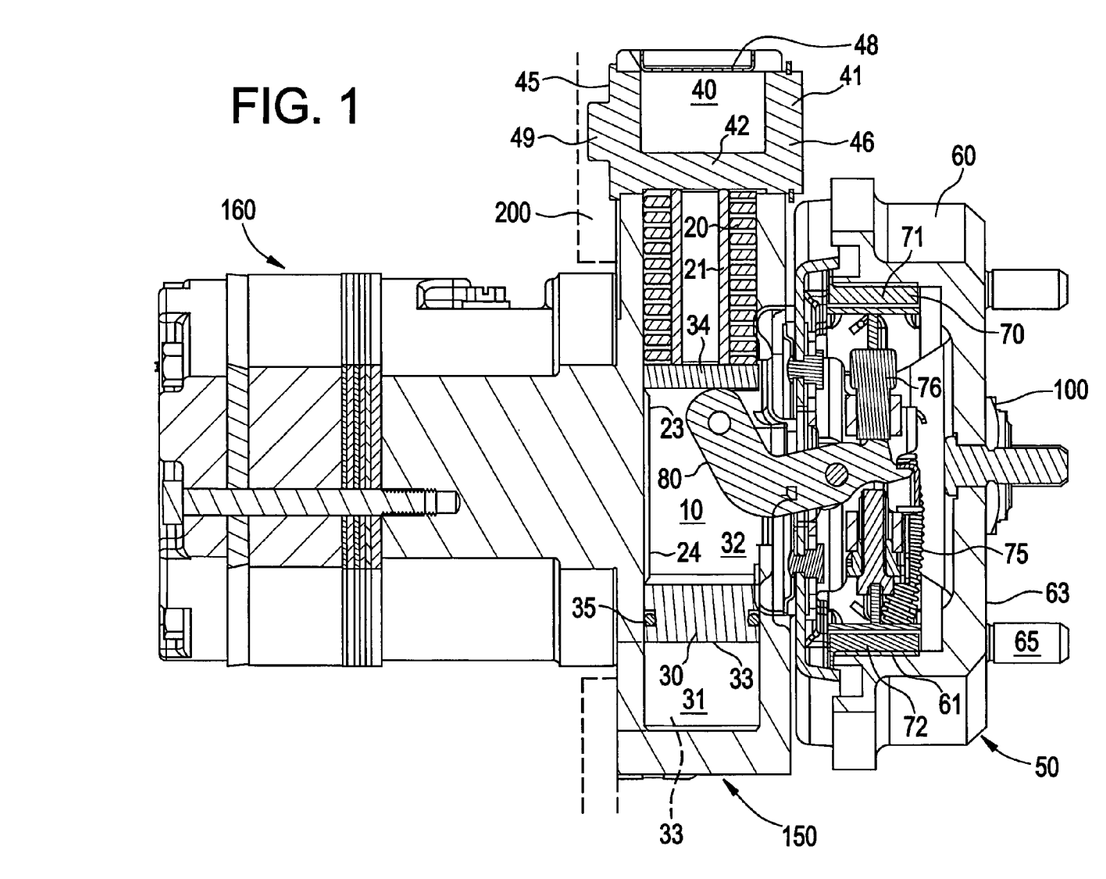
FIG. 1 is a lateral cross-sectional view of the brake actuation mechanism of the present invention. This cross-section is taken along lines 1—1 in FIG. 4.
Figure 2:
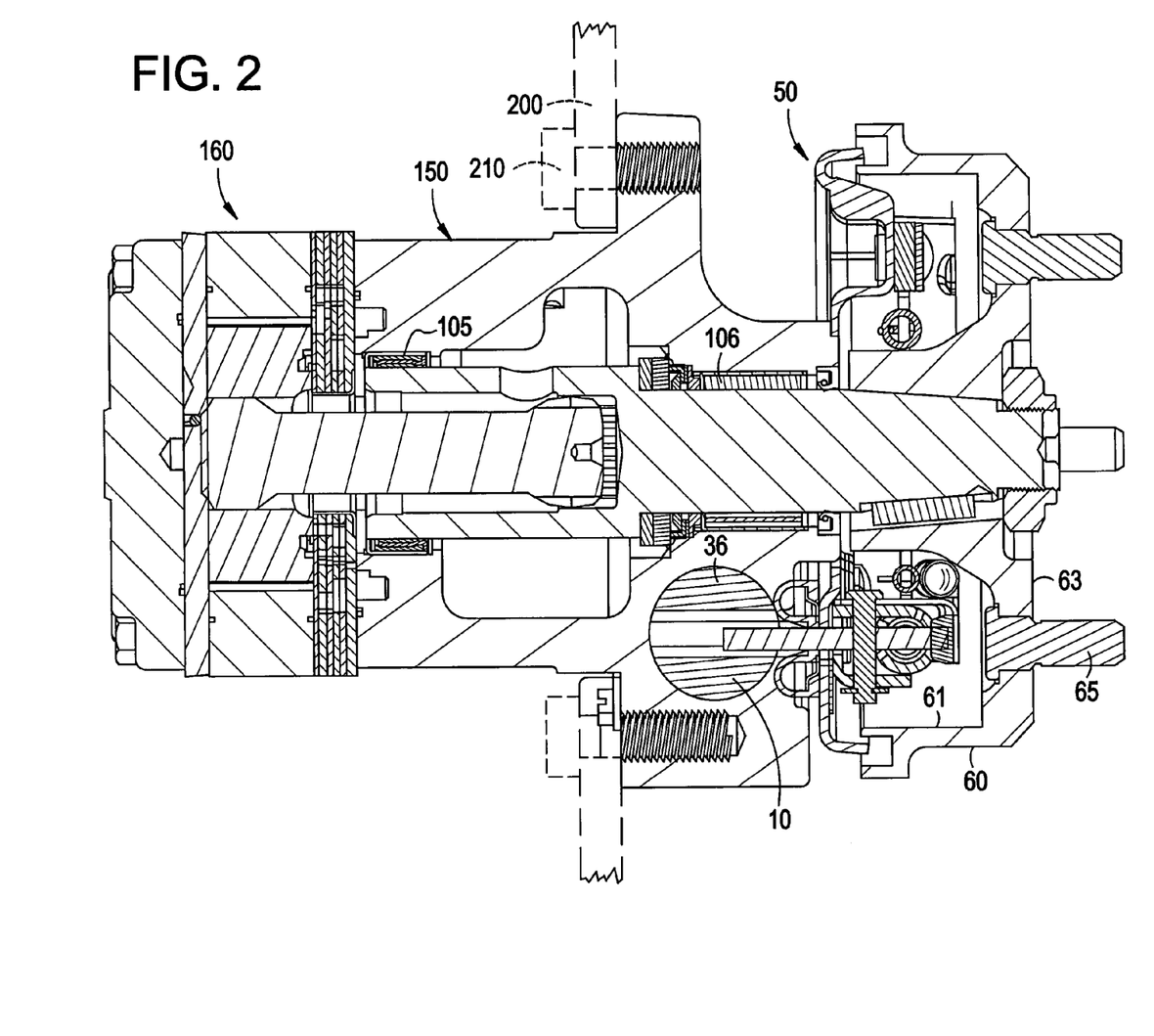
FIG. 2 is a longitudinal cross-sectional view of the device of FIG. 1. This cross-section is taken generally along lines 2—2 in FIG. 4.

The cam 42 forms one end of the application cylinder 24. Thus, upon selective rotary movement of rotary member 41 within the cavity 23, the end of the spring 20 can move into the space 48 provided by the cam. The force of the activating spring 20 to the lever 80 will thereby be interrupted thus sending the brake into a continual condition of off. The selective movement of the cam 42 is rotatable between two conditions in a rotation of substantially 80°. In the first condition, shown in FIG. 1, the angled surface of the cam 42 is at its maximum extension, thus providing for an activated condition of the mechanical brake through the spring 20. However, upon rotation of the cam 42 its surface moves to a low position (FIG. 13), allowing the cam 41 to move the reaction surface 44 away from the spring, thus providing for a deactivated condition of the mechanical brake. A small bolt 47 in a hole engaging a cutout in the cam retains the deactivating cam in its activated condition. A dust cap 48 closes the end of the cavity.

In the embodiment disclosed, the rotation of the cam 42 is accomplished by the use of a hex cap 49 extending externally of the application cylinder 24 off the side thereof. Upon engagement of this hex cap with a socket or wrench, the selective rotation of the deactivating cam 42 can be accomplished to place the brake into its desired condition. This would, for example, as in the embodiment disclosed allow for the movement of the device associated with the frame without the drag of an applied mechanical brake 50.

Figure 14:
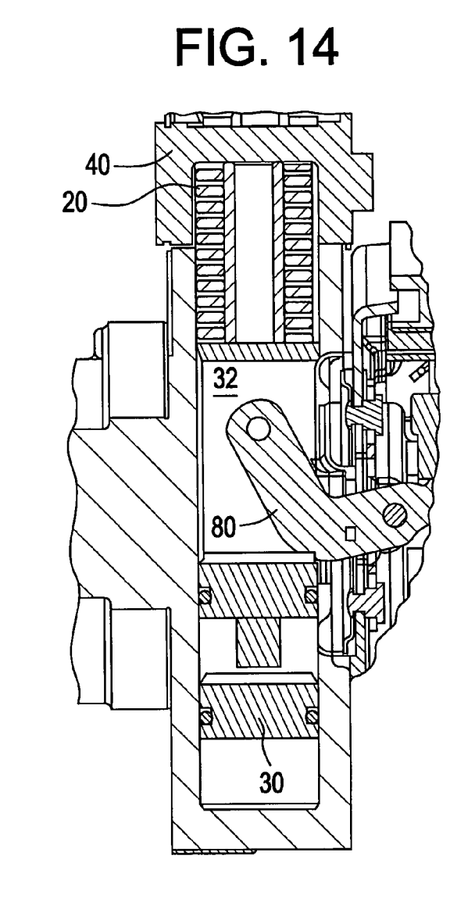

Although the invention has been described in its preferred form with a certain degree of particularity, it is to understood that numerous changes can be without deviating from the invention as described:

For example, the preferred embodiment is shown with a single chamber 31 for the piston 30. This chamber 31 needs to be selectively pressurized. This can be accomplished infinitely through a separate valve, through a series of check and release valves to the pressure and release lines of the gerotor motor or otherwise as previously set forth. It would be possible through the creation of two chambers to allow for a device which can be utilized unvalved to release the brake upon selective pressurization of either of two ports (FIG. 14). This would be particularly helpful in a device incorporating a gerotor motor mechanism because the two lines interconnecting the gerotor motor 160 to the valves controlling such gerotor motor can also be each individually connected to a separate chamber unvalved. Therefor upon the pressurization of either line connected to the gerotor motor 160 the brake would be released, all the while retaining the ability to selectively deactivate the brake through the use of the cam. Two separate valves could also be utilized, due to each chamber. Additional example: a pressure applied spring released actuation member could also incorporate the invention (for example by swapping the spring and piston positions in the preferred embodiment disclosed). Other modifications are possible.

Other changes can be without deviating from the invention as hereinafter claimed:

What is claimed is:

1. An actuating mechanism for a mechanical brake, the brake having a rotatable shaft rotatively supported to a frame by an intermediate member, the rotary shaft having a rotational axis, the brake comprising a friction surface, said friction surface being connected to the shaft,
   a brake member, said brake member being movably connected to the intermediate member,
   a mechanical activator, said mechanical activator being mounted, about a pivot axis extending perpendicular to the rotational axis of the rotary shaft, to said intermediate member for movement between first and second positions, one of said first or second positions moving said brake member into contact with said friction surface to impede the rotation of the shaft, said mechanical actuator being wholly on a first side of the rotational axis of the rotary shaft,
   a spring, means to connect said spring to said intermediate member to bias said mechanical activator in one of said first or second positions,
   a cavity, said cavity being in said intermediate member, said cavity being on the same first side of the rotational axis of the rotary shaft as said mechanical actuator, said cavity being displaced from said friction surface in respect to the longitudinal length of the rotational axis of the shaft,
   a piston, said piston being in said cavity to define a chamber, said piston moveable in said cavity in a first direction, said first direction being substantially perpendicular to the rotational axis of the shaft,
   connect means to connect said piston to said spring and pressurization means to pressurize said chamber to move said spring from its position biasing said mechanical activator in one of said first or second positions to the other of said first or second positions.

2. The brake of claim 1 characterized in that said spring is in said cavity.

3. The brake of claim 2 characterized in that said spring is on the opposite side of said mechanical activator from said piston.

4. The brake of claim 1 characterized in that said mechanical activator is a pivoting lever.

5. The brake of claim 3 characterized in that said mechanical activator is a pivoting lever.

6. The brake of claim 1 characterized in that said piston includes a pressure plug and a spring plug together with a means interconnecting said spring plug to said pressure plug,
   said pressure plug being adjacent to said chamber, and said spring plug being adjacent to said spring.

7. The brake of claim 6 characterized in that said mechanical activator includes a section located between said pressure plug and said spring plug within said chamber.

8. The brake of claim 7 characterized in that said mechanical activator is a lever, and said lever being in contact with said spring plug.

9. The brake of claim 1 characterized by the addition of a deactivating means, and said deactivating means deactivating said spring.

10. The brake of claim 9 characterized in that said deactivating means is between said spring and said intermediate member.

11. An actuating mechanism for a mechanical brake, the brake having a rotatable shaft rotatively supported to a frame by an intermediate member, the brake comprising a friction surface, said friction surface being connected to the shaft,
- a brake member, said brake member being movably connected to the intermediate member,
- a mechanical activator, said mechanical activator being mounted to said intermediate member for movement between first and second positions, one of said first or second positions moving said brake member into contact with said friction surface to impede the rotation of the shaft,
- a spring, means to connect said spring to said intermediate member to bias said mechanical activator in one of said first or second positions,
- a cavity, said cavity being in said intermediate member, a piston, said piston being in said cavity to define a chamber,
- connect means to connect said piston to said spring and pressurization means to pressurize said chamber to move said spring from its position biasing said mechanical activator in one of said first or second positions to the other of said first or second positions,
- a deactivating means, said deactivating means deactivating said spring, and
- said deactivating means is a rotating cam.

12. The brake of claim 1 characterized by the addition of a stop, said stop being located to stop movement of said spring beyond said other of said first or second positions.

13. An actuating mechanism for a mechanical brake, the brake having a rotatable shaft rotatively supported to a frame by an intermediate member, the rotary shaft having a rotational axis, the brake comprising a friction surface, said friction surface being connected to the shaft,
- a brake member, said brake member being movably connected to the intermediate member,
- a mechanical activator, said mechanical activator being mounted to said intermediate member for movement between first and second positions, one of said first or second positions moving said brake member into contact with said friction surface to impede the rotation of the shaft, said mechanical actuator being on a first side of the rotational axis of the rotary shaft,
- a spring, means to connect said spring to said intermediate member to bias said mechanical activator in one of said first or second positions,
- a cavity, said cavity being in said intermediate member, said cavity being on the same first side of the rotational axis of the rotary shaft as said mechanical actuator, said cavity being displaced from said friction surface in respect to the longitudinal length of the rotational axis of the shaft,
- a piston, said piston being in said cavity to define a chamber, said piston moveable in said cavity in a first direction, said first direction being substantially perpendicular to the rotational axis of the shaft,
- connect means to connect said piston to said spring and pressurization means to pressurize said chamber to move said spring from its position biasing said mechanical activator in one of said first or second positions to the other of said first or second positions, the shaft being rotated by a hydraulic pressure motor with a pressurized input and line means to fluidically connect said chamber pressurized line of the hydraulic pressurized motor.

14. The brake of claim 13 wherein the hydraulic pressurized motor has two inputs either one of which might be pressurized and characterized by said line means being connected to both inputs such that the pressurization of either will pressurize said chamber to move said piston.

15. The brake of claim 1 characterized in that the shaft has an axis, said cavity has an axis, and said axis of said cavity being substantially perpendicular to said axis of the shaft.

16. The brake of claim 15 characterized in that said axis of said cavity being offset from said axis of said shaft.

17. The brake of claim 16 characterized in that said intermediate member is substantially of a single piece construction.

18. A brake for a rotatable shaft rotatively supported to a frame by an intermediate member, the rotary shaft having a rotational axis, the brake comprising a friction surface, said friction surface being connected to the shaft,
- a brake member, said brake member being movably connected to the intermediate member,
- a mechanical activator, said mechanical activator being mounted to said intermediate member for movement about a pivot axis extending perpendicular to the rotational axis of the rotary shaft between first and second positions, one of said first or second positions moving said brake member into contact with said friction surface to impede the rotation of the shaft, said mechanical actuator being wholly on a first side of the rotational axis of the rotary shaft,
- a cavity, said cavity being in said intermediate member between the mechanical activator and the other end of said cavity, said cavity having two ends, said mechanical activator extending into said cavity, said cavity being on the same first side of the rotational axis of the rotary shaft as said mechanical actuator, said cavity being displaced from said friction surface in respect to the longitudinal length of the rotational axis of the shaft,
- a spring, said spring being in said cavity between said mechanical activator and one end of said cavity,
- means to connect said spring to one end of said cavity to bias said mechanical activator in one of said first or second positions,
- a piston, said piston being in said cavity to define a chamber, said piston moveable in said cavity in a first direction, said first direction being substantially perpendicular to the rotational axis of the shaft,
- connect means to connect said piston to said spring and pressurization means to pressurize said chamber to move said spring from its position biasing said mechanical activator in one of said first or second positions to the other of said first or second positions.

19. The brake of claim 18 characterized in that said mechanical activator is a pivoting lever.

20. The brake of claim 18 characterized in that said piston includes a pressure plug and a spring plug together with a means interconnecting said spring plug to said pressure plug,
- said pressure plug being adjacent to said chamber, and said spring plug being adjacent to said spring.

21. The brake of claim 20 characterized in that said mechanical activator includes a section located between said pressure plug and said spring plug within said chamber.

22. The brake of claim 21 characterized in that said mechanical activator is a lever, and said lever being in contact with said spring plug.

23. The brake of claim 21 characterized by the addition of a deactivating means, and said deactivating means deactivating said bias means.

24. The brake of claim 23 characterized in that said deactivating means is between said spring and said one end of said cavity.

25. A brake for a rotatable shaft rotatively supported to a frame by an intermediate member, the brake comprising a friction surface, said friction surface being connected to the shaft,
  a brake member, said brake member being movably connected to the intermediate member,
  a mechanical activator, said mechanical activator being mounted to said intermediate member for movement about a pivot axis extending perpendicular to the rotational axis of the rotary shaft between first and second positions, one of said first or second positions moving said brake member into contact with said friction surface to impede the rotation of the shaft,
  a cavity, said cavity being in said intermediate member between the mechanical activator and the other end of said cavity, said cavity having two ends, said mechanical activator extending into said cavity,
  a spring, said spring being in said cavity between said mechanical activator and one end of said cavity, bias means to connect said spring to one end of said cavity to bias said mechanical activator in one of said first or second positions,
  a piston, said piston being in said cavity to define a chamber, said piston including a pressure plug, a spring plug, and a bypass means interconnecting same, said pressure plug being adjacent to said chamber, said spring plug being adjacent to said spring, said mechanical activator including a section located between said pressure plug and said spring plug within said bypass means,
  connect means to connect said piston to said spring pressurization means to pressurize said chamber to move said spring from its position biasing said mechanical activator in one of said first or second positions to the other of said first or second positions,
  a rotating cam, a deactivating means, said deactivating means deactivating said bias means, and said deactivating means is a rotating cam.

26. The brake of claim 18 characterized by the addition of a stop, said stop being located to stop movement of said spring beyond said other of said first or second positions.

27. A brake for a rotatable shaft rotatively supported to a frame by an intermediate member, the rotary shaft having a rotational axis, the brake comprising a friction surface, said friction surface being connected to the shaft,
  a brake member, said brake member being movably connected to the intermediate member,
  a mechanical activator, said mechanical activator being mounted to said intermediate member for movement between first and second positions, one of said first or second positions moving said brake member into contact with said friction surface to impede the rotation of the shaft, said mechanical actuator being on a first side of the rotational axis of the rotary shaft,
  a cavity, said cavity being in said intermediate member between the mechanical activator and the other end of said cavity, said cavity having two ends, said mechanical activator extending into said cavity, said cavity being on the same first side of the rotational axis of the rotary shaft as said mechanical actuator being displaced from said friction surface in respect to the longitudinal length of the rotational axis of the shaft,
  a spring, said spring being in said cavity between said mechanical activator and one end of said cavity,
  means to connect said spring to one end of said cavity to bias said mechanical activator in one of said first or second positions,
  a piston, said piston being in said cavity to define a chamber, said piston moveable in said cavity in a first direction, said first direction being substantially perpendicular to the rotational axis of the shaft,
  connect means to connect said piston to said spring and pressurization means to pressurize said chamber to move said spring from its position biasing said mechanical activator in one of said first or second positions to the other of said first or second positions,
  the shaft being rotated by a hydraulic pressure motor with a pressurized input and line means to fluidically connect said chamber pressurized line of the hydraulic pressurized motor.

28. A brake actuator for a mechanical brake on a rotating shaft having an axis of rotation, the mechanical brake having an operating pivot lever movable about a pivot axis extending perpendicular to the axis of rotation of the rotary shaft between first and second positions each producing a different activated condition of the brake,
  said brake comprising an actuating mechanism, said actuating mechanism having a cavity with an axis and two ends, said axis of said cavity being substantially perpendicular to and offset from the rotational axis of the shaft, the operating lever of the brake having a part in said cavity, said cavity being displaced from said friction surface in respect to the longitudinal length of the rotational axis of the shaft,
  a spring, said spring being in said cavity extending between an end of said cavity and said part of the operating lever so as to bias said lever in one of the first or second positions,
  a piston, said piston being in said cavity between the other end of said cavity and said part of the operating lever,
  bypass means bypassing said operating lever to connect said piston to said spring, said piston in said cavity defining a chamber,
  and selective means to pressurize said chamber to move said piston against said bias of said spring providing the ability for the operating lever to move to the other of the first or second positions.

29. The brake of claim 28 characterized by the addition of stop means to prevent the over-compression of said spring.

30. A brake actuator for a mechanical brake on a rotating shaft having an axis of rotation, the mechanical brake having an operating lever movable between first and second positions each producing a different activated condition of the brake,
  said brake comprising an actuating mechanism, said actuating mechanism having a cavity with an axis and two ends, said axis of said cavity being substantially perpendicular to and offset from the rotational axis of the shaft, the operating lever of the brake having a part in said cavity,
  a spring, said spring being in said cavity extending between an end of said cavity and said part of the operating lever so as to bias said lever in one of the first or second positions,
  a piston, said piston being in said cavity between the other end of said cavity and said part of the operating lever, bypass means to connect said piston to said spring with the capacity to overcome said bias of said spring, said piston in said cavity defining a chamber, selective means to pressurize said chamber to overcome said bias of said spring providing the ability for the operating lever to move to the other of the first or second positions, a deactivating cam, said deactivating cam being between said spring and an end of said cavity and said deactivating cam being movable so as to substantially eliminate said bias of said spring on the operating lever.

31. The brake of claim 28 characterized in that said bypass means includes said piston having two plugs axially spaced in said cavity on either side of said part of the operating lever and a bypass portion connecting said two plugs.

32. A brake for a rotatable shaft rotatably supported to a frame by an intermediate member, the brake comprising a mechanical activator, a cavity, said cavity being in said intermediate member, means for said mechanical activator to alter the condition of said brake, said cavity having an end, a deactivating cam, said deactivating cam being located at said end of said cavity, said deactivating cam having an activating and a deactivating surface, a spring, said spring being in said cavity between said deactivating cam and said mechanical activator, and selective means to move said cam engaging said activating surface with said spring to spring bias said mechanical activator in respect to said end of said cavity.

* * * * *